E. SILEN.
VIOLIN PIANO.
APPLICATION FILED JUNE 17, 1911.

1,045,899.

Patented Dec. 3, 1912.

Erick Silen

Witnesses

Inventor by C. A. Snow & Co.
Attorneys.

E. SILEN.
VIOLIN PIANO.
APPLICATION FILED JUNE 17, 1911.

1,045,899.

Patented Dec. 3, 1912.
7 SHEETS—SHEET 7.

Erick Silen
Inventor,

UNITED STATES PATENT OFFICE.

ERICK SILEN, OF MAYGER, OREGON.

VIOLIN-PIANO.

1,045,899.  Specification of Letters Patent.  Patented Dec. 3, 1912.

Application filed June 17, 1911. Serial No. 633,702.

*To all whom it may concern:*

Be it known that I, ERICK SILEN, a citizen of the United States, residing at Mayger, in the county of Columbia and State of Oregon, have invented a new and useful Violin-Piano, of which the following is a specification.

This invention relates to an improvement in violin pianos, the primary object of the invention being the provision of a series of mechanisms for producing upon the strings thereof a violin effect.

A further object of this invention is the provision of individual bow disks, so disposed to the strings of a piano, as to be tilted into contact therewith as the keys of the piano are manipulated in the usual manner, in combination with mechanisms for producing a tremolo effect or increase or decrease the loudness by the use of said bow disks.

A further object of this invention is the provision of a series of rotatably mounted bow disks, one to each piano string, means for moving the said bow disks into and out of engagement with the strings, and with simultaneously operated resin supplying means for each disk.

A still further object of this invention is the provision of a violin piano which is provided with a series of individually key actuated bow disks, mechanism for imparting a vibrating effect to said disks to produce a quaver effect in the music, and a separate mechanism manually controlled by the operator, or performer, so as to strike the respective strings actuated upon by the bow disks to produce a tremolo effect.

With the foregoing and other objects in view which will appear as the description proceeds, the invention resides in the combination and arrangement of parts hereinafter described and claimed, it being understood that changes in the precise embodiment of invention herein disclosed can be made within the scope of what is claimed without departing from the spirit of the invention.

In the drawings Fig. 3 is an enlarged detailed elevation of the bow disk operating mechanism, the tremolo producing mechanism, and a portion of the quaver producing mechanism. Fig. 3$^a$ is a section taken on line 3$^a$—3$^a$ of Fig. 1. Fig. 4 is a front elevation thereof.

Referring to the drawings, A designates the piano cabinet, having the usual keyboard B and the vertically or angularly stretched strings C, said strings being arranged across the front portion of the sounding board, which comprises the sounding board of usual construction. As shown, this sounding board is vertically disposed within the piano cabinet and is of the usual shape.

Figure 1:
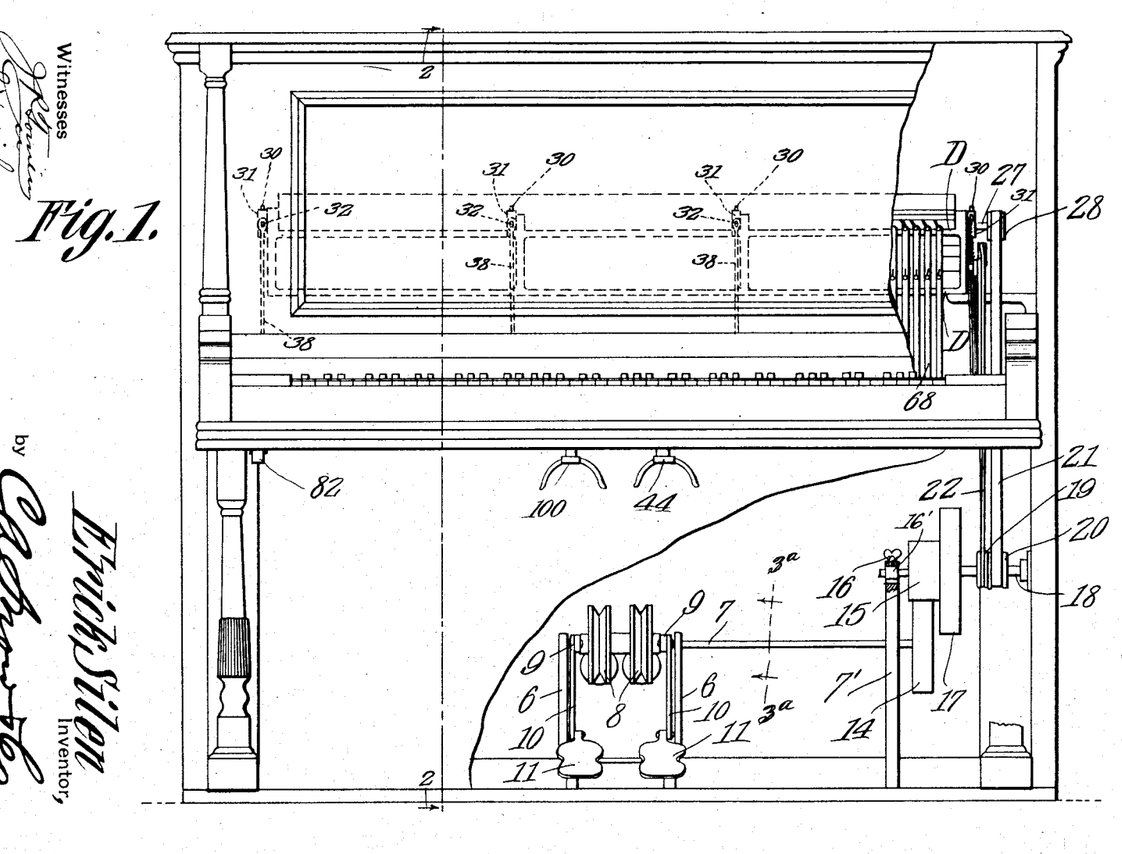
—Figure 1 is a front elevation of a violin piano constructed according to this invention, a portion of the front panels of the same being broken away to show the construction of the power device and the right hand side of the violin-attachment, dotted lines showing the position of the support for such attachment.

Mounted upon the base of the piano in the lower right hand corner as viewed in Fig. 1, are the two standards 6, which have rotatably mounted therein the horizontally disposed shaft 7, which has keyed thereon the power transmitting disks 8, which are grooved, the grooved spindle portions 8$^a$ being provided with a covering of soft material such as felt or flannel, or in fact any material that will permit the ratchet ends 12 of the weighted pendants 13 to properly engage the said surface 8$^a$ and thereby give it the proper movement and yet prevent the same having a movement in reverse direction, the weights 13 always holding the pawls 12 in engagement with the said surface 8$^a$ of the power groove rollers 8. Pivoted upon the shaft 7 upon opposite sides of the disks or groove pulleys 8 are the two levers 9, the forward ends of which are connected by the links 10 to the foot pedals 11 pivoted in operable position and projecting through the lower panel of the piano cabinet. It will thus be seen that by a movement of the pedals up and down the ratchets 12 transmit motion to the pulleys 8 thus rotating continuously, as desired, the shaft 7.

Figures 3, 3A, 4:
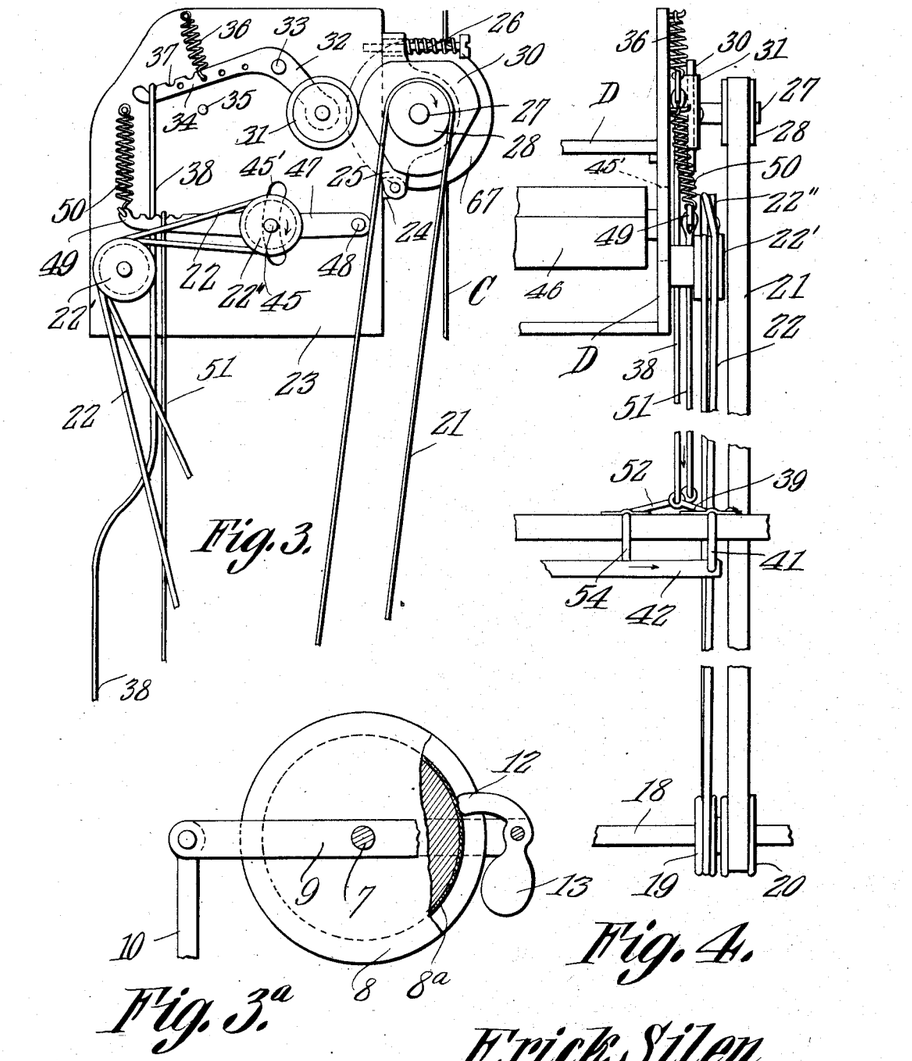

The shaft 7 has its outer end journaled in the long standard 7' and upon the free end thereof is keyed the large friction wheel 14 which is held in adjustable contact with the smaller friction wheel 15 by means of the adjusting device 16 a wing screw in the upper end of the standard 7' to bear upon the box 16' to hold the same downwardly and consequently the shaft 18. The friction wheel 15 is carried upon the shaft 18, which also carries the balance or fly wheel 17, whereby an even or continuous motion is given the shaft 18 through the medium of the pedals 11 and wheels 8. Made fast and rotatable with the shaft 18 are the pulleys 19 and 20, which have their respective belts 21 and 22 passing therearound. These belts as clearly illustrated in Figs. 3 and 4 of the drawings pass upwardly upon the outside portion of the mechanism of the piano and within the casing or cabinet thereof.

Mounted transversely of the piano and disposed at the proper relation to the strings C thereof is a frame D, the right hand plate 23 of which has mounted thereon the various mechanisms as will hereinafter be set forth.

Carried upon the forward edge of each of the plates 23, said plates 23 being disposed in spaced relation throughout the framework of the piano, is a lug 24, which has pivoted thereto the frame or journal box 25, whose upper end is normally held toward its respective plate 23 by means of the spring actuated adjusting pin 26. This pin 26, however, permits the shaft 27, which is journaled in the boxes 25, a movement toward and away from the outer face of its plate 23, said shaft thus having a rotary movement and being bodily vibrated or moved to and from the strings C.

Mounted upon the outer end of the shaft 27 is a small pulley 28 which receives its motion from the belt 21, the said shaft 27 having mounted thereon the cam 30, said cam being rotatable with said shaft and assisting to produce what is termed the quaver effect of the instrument. As there are a series of plates 23, a series of boxes 25, and cams, one of each to a frame, are used.

The bell crank lever 32 is pivoted to the outer face of the plates 23, as at 33, the wheels 31 being carried in the outer end thereof and normally out of the path of the cam 30, one to each plate 23, the long end 34 of said bell crank lever 32 being limited in its downward movement by means of the stop 35 and the spiral spring 36, the notches 37 in the upper edge thereof being adjustably engaged by means of its respective quaver operating rod 38, the lower end of each rod 38 being connected to the short lever 39 of the rock shaft 40. The forward hooked ends 41 of the rock shaft 40 are pivoted to the sliding bar 42 carrying the slots 43, whereby the right knee-operated lever 44 may be moved to the right, engaging the lug 43 and thereby moving the slide 42 so that all of the rock shafts 40 are moved, the quaver rods 38 being pulled down upon so as to move the disks or wheels 31 into the path of the cam surfaces of the cams 30, thereby causing the shaft 27 and the bow disks 67 thereon to be vibrated toward and away from the ends of the plates 23 and into and out of engagement with the strings C of the piano.

Figures 13, 15:
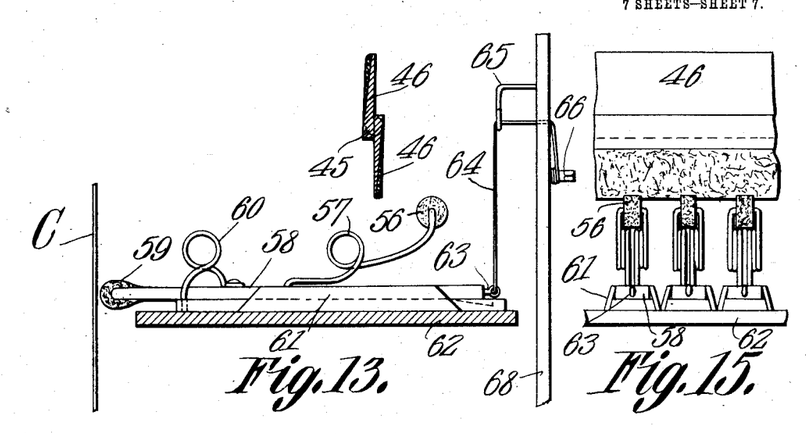
Figs. 13, 14, 15 and 16 are detail views of the thrill producing mechanisms.

To produce what is termed the tremolo effect, upon this piano, the belt 22 passes around the idle pulley 22' carried by the plate 23 and over the pulley 22'' keyed to the shaft 45, said shaft being mounted in the segmental slots 45' of each plate 23 for bodily sliding movement and carrying the two oppositely disposed strips or wings 46, which are adapted to be moved upwardly or downwardly by means of the pivoted frame 47 which is pivoted at 48 to the plate 23, the long notched end 49 of the said lever being normally held upwardly by means of the coil spring 50 connected thereto and the respective plate 23. To pull the said lever downwardly so that the wings 46 will engage a tremolo hammer, hereinafter to be described, a rod 51 is connected to any one of the notches formed in the end of the lever 49 and has its lower end connected to the crank arm 52 of the rock shaft 53, the forward end 54 thereof being pivotally connected to the sliding block or bar 42', which is provided with the lug 55 oppositely disposed to the lug 43. By this means the lever 44 may be moved to the left contacting the lug 55 and consequently rocking the shaft 53 and pulling the rod 51 downwardly so that the lever 47 carries with it the wings 46. The respective rollers 56, as clearly shown in Fig. 13, are each carried in the upper free end of the spring 57, there being one of these to each key of the piano. Each spring 57 has one end anchored to a vibratory rod 58, which is mounted within the flange plate 61, the rod 58 being normally held in the position shown in Fig. 13 by means of the spring 60, which has one end anchored to the rod 58 while the other end is anchored to the base plate 62. An eye 63 is connected to the end of the rod 51 nearer the bowing disk operating rod 68, and a cord 64 is connected at one end to engage the eye 63, the cord being passed through the bracket 65 and the lever 68 with its outer end adjustably connected by means of a screw plug 66 to the rod 68. These flange plates 61 are carried upon the base plate 62 and upon the inner end of the vibratory rod 58 are the felt hammers 59, one to each string C of the instrument, the same being normally held out of engagement with the string but when acted upon by the wings 46, they are projected so as to strike the strings C and produce a tremolo effect thereon.

Figure 2:
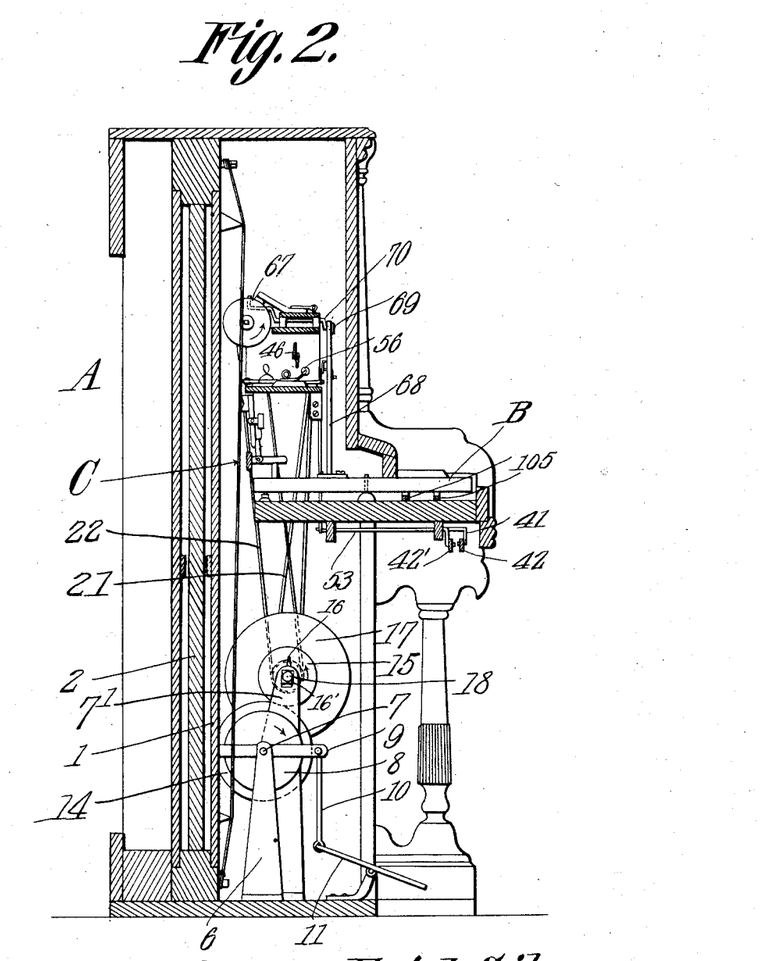
Fig. 2 is a vertical transverse sectional view through the violin piano on the line 2—2 of Fig. 1.
Figure 6:
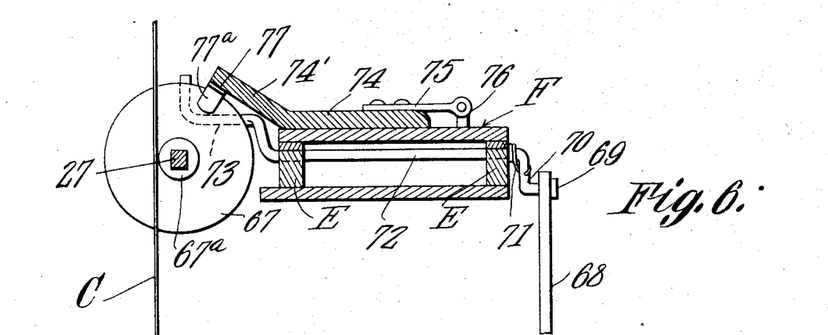
Figs. 6, 7, 8, 9, 10 and 11 are detail views of the bow disks with their adjacent mechanisms.
Figure 7:
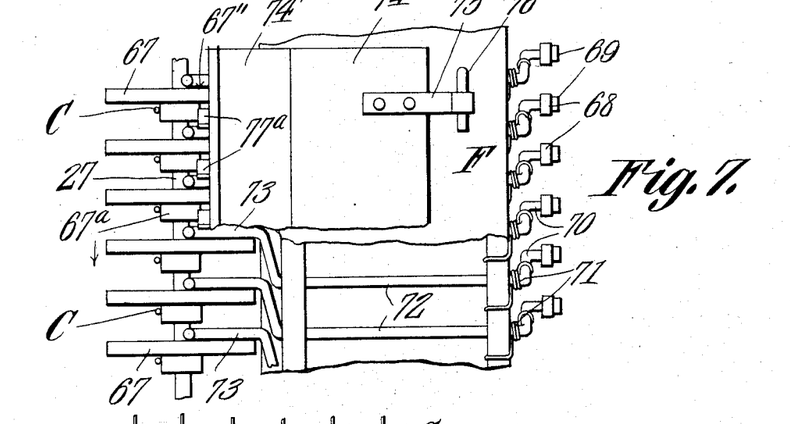
Figures 10, 11, 12:
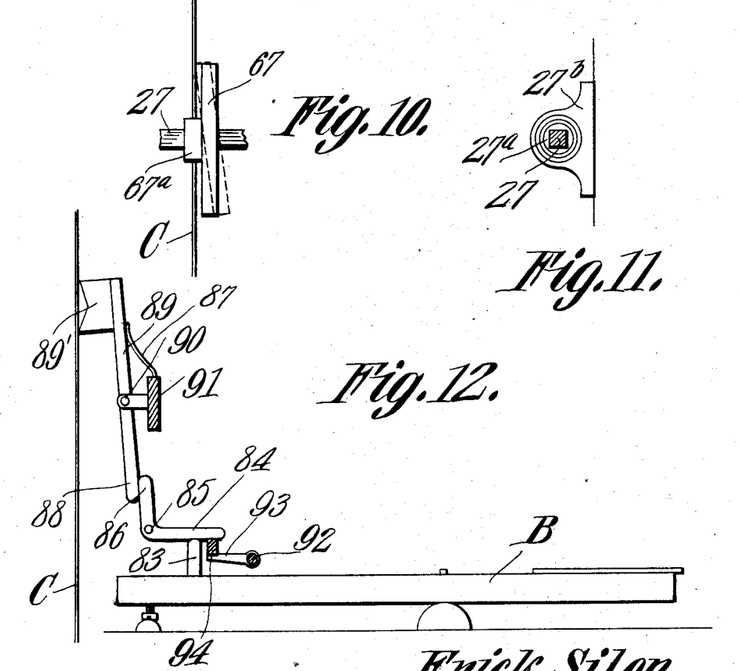
Fig. 12 is a detailed elevation of the clamping device used in connection with the quaver producing mechanism.

By referring to Figs. 1 and 2 of the drawings it will be seen that the lower ends of the rods 68 are normally engaging with the inner free upwardly moving ends of the keys B. By this means these rods are moved up and down as the keys are operated. The upper ends of these rods 68 are connected to the crank arms 70 and are held from outward displacement therewith by means of the head or studs 69, the coiled springs 71 normally holding the crank arms 70 so that the rods 68 are held downwardly. These crank arms 70 have their long portions 72 journaled in the bearings E of the frame, one of these rods to each bow disk 67, said bow disks 67 being mounted tiltingly upon the shaft 27, which is a squared shaft as clearly shown in Figs. 6, 10 and 11. When not in use these bow disks normally assume the position as shown in Figs. 7 and 10, with the faces 67' out of contact with the strings C, by reason of the movement of the engaging end 73 of the crank 70 and the stationary sound-deadening stops 67ª against which the string C will now rest. In order to tilt the said bow disks individually when desired, this operation being clearly shown in Fig. 10, the key B is moved, raising the rod 68 which in turn operates the crank 70 and causes the bow-disk engaging end 73 to engage the face 67" of its respective disk and tilt it as shown in dotted lines in Fig. 10, so that the surface near the periphery or circumference thereof will touch the strings C and produce a violin bow effect thereon. These disks 67 may be made of any material but are preferably of a celluloid or hard piece of fiber, or vulcanized rubber.

Figure 8:
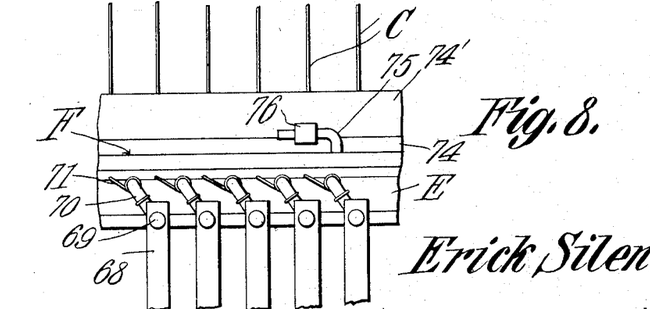
Figure 9:
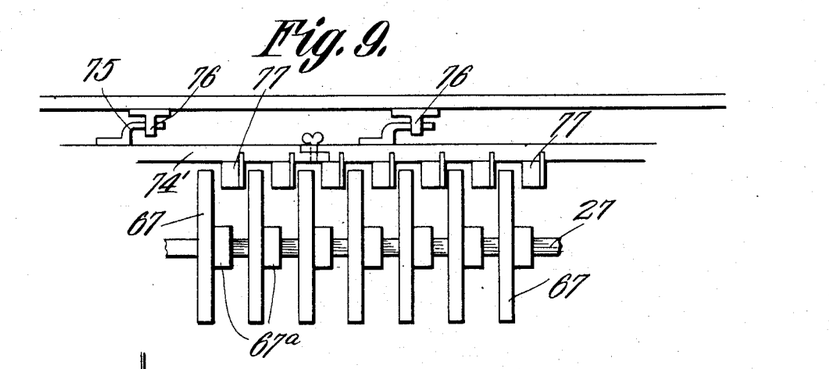

Mounted oscillatingly upon the plates F, is a plate 74, whose end near the strings C is extended upwardly on an incline as at 74', while its flat portion is hinged to the plate F by means of the hinge 75—76, this hinge as clearly shown in Fig. 8, permitting an oscillating or reciprocating movement of the plate 74 as well as a vertical movement, so that the inclined end 74 may be raised or lowered or will be given a movement transversely of the instrument. Carried upon the under face of the inclined portion 74, one to each disk 67 of the instrument is a holder 77, which carries therein a block of resin 77ª, said block of resin 77ª being adapted to be brought into contact with the base 67' of the respective bow disks, so as to supply the resin thereto. In order to hold the plate 74 in the position as shown in Fig. 7, that is so that the resin 77ª will be out of contact with the respective disks, a spring 77" is provided, while to operate against said spring and to bring the block of resin 77ª into contact with the surface of the bow disks 67, a link 78 is provided, and is operated by the rod or rock shaft 79 whose lower hooked end 80 is pivoted to the inner end of the sliding plate or rod 81 whose outer hook end 82 is disposed in the forward portion of the instrument below the key-board thereof so that the operator or performer, may at any time pull said rod 81 outwardly and thereby move the plate 74 so that the various resining devices will be placed into contact with their respective bow disks 67, and when the disks have been supplied sufficiently with the resin, the plate 81 is released and the spring 77" will return the parts to their relative inoperative positions.

As shown in Fig. 12 each key B carries upon its inner end a projection or lug 83 which is normally in engagement with the outer end 84 of the bell crank lever 85, there being one of these levers to each string C of the instrument, said bell crank lever 85 having its upper end 86 normally held by the spring 87 against the upper free end 88 of the lever 89 carrying at its upper end the felt damper 89'. This device is provided to produce the proper damping effect upon the strings as is usually used in pianos. By this means each one of the dampers 89' will be operated individually but should it be desired to operate them simultaneously, as is often the case to obtain sustained tones, a longitudinal strip 94 is carried upon the inner end 93 of the bell-crank lever 92, which is connected at its inner end by means of a rod 95 to a bell crank lever 96 at the forward portion below the key-board of the piano. The rod 97 has its hooked end 98 in the path of the knee lever 99 which is provided with the usual knee engaging portion 100. This lever 99 when moved to the left will push upon the hook end 98 of the rod 97 causing the bell crank lever 96 to pull upon the link or rod 95 actuating the bell crank lever 93 so as to raise the longitudinal strip 94 and simultaneously lift the free ends of each and every bell crank lever 95, thus operating all of the dampers 89' simultaneously. These dampers 89' are pivoted to the transversely disposed strip or bar 91 disposed in front of the strings C, the full length of the instrument.

In order to limit the downward movement of the forward ends of the keys B the hooked end 101 of the rod 102 is disposed to the right of and in the path of the lever 99, the other end of the rod 102 being pivoted to the vertically disposed double lever 103, whose upper end is connected to the cam bar or rod 104, which is adapted to be moved up or down to regulate the distance or throw of the keys B. By this means all of the keys are limited in their movement to regulate the area of contact of the disks 67 with the strings C and consequently produce a soft or loud action upon the strings C, this limiting device, as shown limiting the pivotal movement of the respective keys B of the board so that the operator though striking the keys with the same pressure will produce a soft or loud tone in the instrument.

Figure 5:
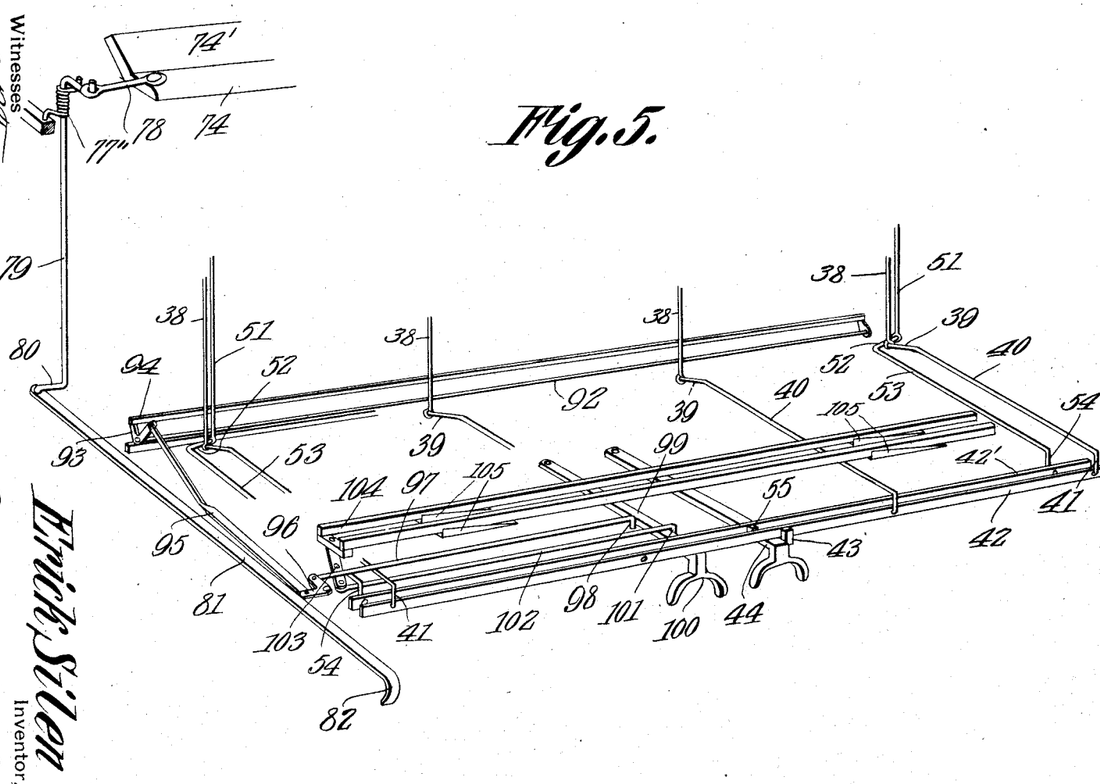
Fig. 5 is an enlarged diagrammatic perspective view of the various manually controlled levers for operating the various mechanisms of this violin piano.

The bar 104 is so disposed below the keys and in the frame of the piano, that the wedges 105 when the bar is moved, act as a means to raise the bar at the two places as indicated in Fig. 5, so that the underside of the keys are opposed to the upper edge of the two bars or strips of the member 104 thereby limiting the downward movement of the outer ends of the keys of the piano, and limiting the movement of the bowing disks to and from string engaging position. This is entirely controlled by the movement of the knee lever 100 as clearly shown in Fig. 5.

Figure 14:
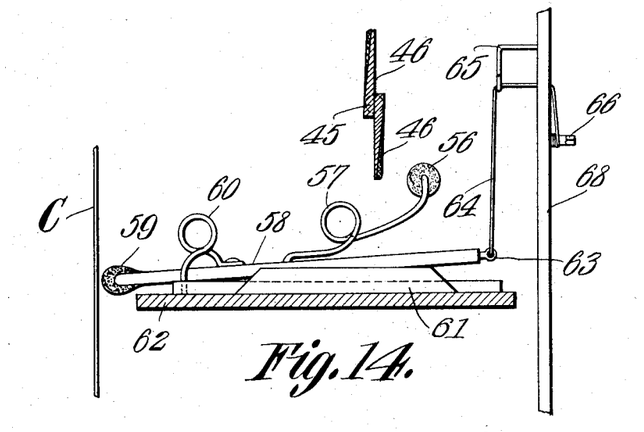
Figure 16:
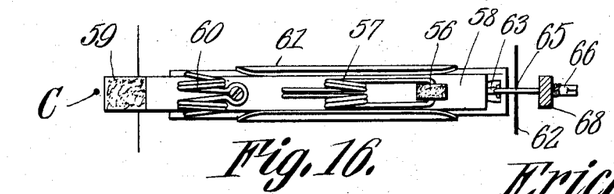

From the foregoing description taken in connection with the drawings the operation of this instrument will be readily understood; but briefly stated it is as follows: Where a foot motor such as shown, is employed the performer sits at the piano in the usual position with his feet placed upon the pedals 11 and operates them alternately so as to give a continued rotation of the shaft 7 and consequent movement of the belts 21 and 22. By this means the shafts 27 and 45 are rotated in unison and the bow disks are continuously rotated, as are also the series of wings 46. The performer then operates the keys B in the usual manner and this action raises the rods 68 which in turn operate their respective bow disks and tilts them, as shown in Fig. 10 against the respective strings C, thus giving a bowed violin effect. Should it be desired to give a tremolo effect, however, the rod 51 is pulled down through the medium of the knee-operated lever 44 so that the lug 55 is moved to the left, this action pulling the frames 47 and their shafts 45 downwardly so that the rotating wings 46 will engage the spring-cushion rollers 56, the rod 68 having lifted the outer ends of the vibratory bars 58, as clearly shown in Fig. 14, so that the vibratory action imparted to the spring 57 will cause the hammers 59 to project and strike the respective strings C, thus producing with the bowed effect a tremolo effect.

To vary the loudness, the knee lever 44 is moved in the opposite direction so that the lug 43 will be engaged thereby, and actuate the rock shaft 40 pulling upon the rods or links 38 and causing the rollers 31 to be projected in the path of the rotating cams 30 mounted upon the shaft 27, this action causing the shaft and the bow disks 67 to be moved toward and from the strings C to produce a vibrating of said disks and produce a quaver effect through the respective bow disks 67. When the rods 38 are released, the spring clamp devices 25—26 will hold the shaft 27 against the plates 23 and in position for producing the simple bow effect.

As hereinbefore mentioned to release all of the dampers 89′, so that the tremolo effect will be louder, the knee lever 99 is moved to the left so as to push upon the rod 97 thereby actuating the link 95 and raising the longitudinal strip 94, thus raising the inner end of the bell crank levers 84 and consequently moving all of the dampers 89′ out of contact with the strings C.

Should it be desired to produce the pianissimo effect, it is simply necessary to move the knee lever 99 to the right pulling upon the rod 102 which in turn raises the slide or abutment 104 so as to limit the downward movement of the outer ends of all of the keys B which action limits and reduces the downward movement of said keys and the consequent throw of the disks 67 and also the tremolo hammers 59.

By means of the spring-returned oscillatory plate 74 as hereinbefore mentioned, and the lever 81, the said plate 74 may be moved so as to present its blocks of resin to the proper side of its respective bow disks. It is also evident that all of the various mechanisms are in proper position to the performer at the instrument, they being within his reach so that they may be operated at will to produce the desired effect.

What is claimed is:

1. A violin piano, having a primary mover, a rotary and bodily vibratory shaft operably connected with said primary mover and rotated therefrom, a series of strings, a key board, a series of bowing disks, one to each string mounted upon and rotatable with said shaft, said bowing disk being projected toward and away from the strings and between and normally out of contact with the adjacent strings, means connected to each key and to its respective disk to, when the key is depressed, move the disk into contact with the string, a plurality of cams mounted upon the shaft, a plurality of levers disposed to engage said cams, and manually operated means connected to said levers for moving the levers to engage said cams and impart to the shaft during the rotation of the shaft and disks a vibratory movement relatively to the strings.

2. A violin piano, having a series of strings, a primary mover, a frame disposed in front of said strings, a series of spring-returned pivoted boxes carried by said frame, a shaft rotatably mounted in said boxes and operably connected to said primary mover, a series of bowing disks disposed between the strings and carried upon and rotatable with the shaft, there being one disk to each string, each bowing disk being normally out of contact with its string, a key-board, means for operably connecting each disk to its respective key of the key board, whereby the depression of a key moves its disk into engagement with its respective string, a plurality of cams mounted upon said shaft, and a plurality of manually operated levers, one to each cam disposed to be moved into engagement with the cams during the rotation of said shaft to coact with the spring-returned boxes to vibrate the shaft.

3. A violin piano, having a key-board, a series or strings, a series of continuously rotating disks, one to each string, a series of tremolo hammers one to each string, and means for operably connecting one of said tremolo hammers and one of the disks to its respective key of the key-board, whereby the depression of the key will simultaneously operate its rotating disk and tremolo hammer.

4. A violin piano, having a series of strings, a key-board, a shaft rotatably disposed in front of the strings, a series of bowing disks, one to each string carried by and rotatable with said shaft, means connected to each disk and its respective key of the key-board for moving into and out of contact with its respective string each disk, and a series of tremolo hammers, one to each disk operably connected to the disk-operating means whereby a single disk and its tremolo hammer are operated by the same key.

5. A violin piano, having a series of strings, a key-board, a rotatable shaft mounted in front of the strings, a series of disks mounted upon and rotatable with the shaft, said disks having a tilting movement toward and away from their respective strings, there being a disk to each string, a series of tremolo hammers, each of which is operably connected with its respective key of the key-board and disk, another shaft rotatably mounted in front of the strings, and means carried by said shaft to engage the tremolo hammers when the keys are depressed to vibrate the tremolo hammers and impart a vibratory movement to the strings simultaneously with the rotary engagement of the disks with the strings.

6. A violin piano, having a series of strings, a key-board, two shafts rotatably mounted in front of said strings, means for rotating said shafts, a plurality of bowing disks carried by and rotatable with one of said shafts, a plurality of wings carried by the other shaft, the disk-carrying shaft being mounted for oscillatory movement, means operably connecting each of the respective disks with its key of the key-board, whereby upon the depression of the key the disk is moved to contact its string, means for oscillating the disk-shaft to vary the loudness of tone, a series of tremolo hammers disposed to be actuated by the wings, there being one to each key, and means for operatively connecting each hammer to a key, whereby the depression of the key moves the hammer into operable engagement with the rotating wings to vibrate the hammer simultaneously with the contact of the disk with the string.

7. A violin piano having a plurality of strings, a key-board, a rotating bowing disk adjacent to each string and normally out of contact therewith, means for moving the disk into contact with the string operably connected to its key to operate the disk when the key is depressed, means for imparting a bodily vibratory action to the rotating disk toward and away from the strings, a tremolo hammer disposed adjacent to the string, means for vibrating said hammer, and means connecting the tremolo hammer to the key, whereby when the key is depressed the hammer will operably engage said vibrating means to be intermittently thrown into engagement with the string.

8. A violin piano having a plurality of strings, a key board, a rotating disk disposed adjacent to each string and capable of being tilted to engage the string, means to tilt said disk, means connecting said tilting means to its key, whereby the depression of the key will tilt the disk into engagement with the string, means for imparting a bodily vibratory movement to the disk to slide the disk to and from the strings, a tremolo hammer mounted to strike its string, means normally out of contact with the hammer for imparting to the hammer a vibratory movement, and means connecting the tremolo hammer to the key, whereby the tremolo hammer and disk tilting means are operated simultaneously.

9. A violin piano, having a series of strings, a key-board, a shaft rotatably disposed in front of the strings, a plurality of disks carried by and rotatable with said shaft, said disks being mounted upon said shaft to be individually tilted in a longitudinal direction with relation to the shaft, the periphery of each disk being disposed between adjacent strings, means for tilting each disk to contact its respective string, means operably connecting each of said means with its key of the key-board, and means for vibrating the shaft and bodily moving all disks at right angles to the plane of the strings.

10. A violin piano, having a plurality of strings, a shaft rotatable in front of said strings and disposed longitudinally of the instrument, a key-board, a plurality of bowing disks mounted upon and rotatable with said shaft, the periphery of said disks being projected between the adjacent strings of the instrument, there being one disk to each string, said disk being normally out of contact with the strings, means operably connected to key of the key-board and its respective disk for tilting the disk to bring a portion of the disk near the periphery into engagement with its respective string, and means for bodily moving the shaft and all disks, whereby the contact surface of each disk with relation to its string is varied.

11. A violin piano, having a plurality of strings, a key-board, a frame connected longitudinally of the instrument and in front of the strings, a plurality of spring-returned boxes carried upon the forward face of said frame, a shaft rotatably mounted in said boxes, a plurality of bowing disks, one to each string of the instrument carried by and rotatable with said shaft, said disk being normally out of contact with the string, means operably connecting a key of the key-board with its respective disk, whereby the disk is moved into engagement with its string, coöperable means carried by the frame and said shaft, said means being normally out of operation, and manually actuated means for actuating one of the coöperable means whereby the said shaft and its boxes are moved to and from the plane of the strings to vary the contact surface of the respective disks with their respective strings.

12. A violin piano, having a plurality of strings, a key-board, a plurality of rotary bowing disks, disposed one to each string of the instrument, means for simultaneously moving all of said disks toward and away from said strings, said disk normally being out of contact with the string, means connected to a key of the key-board and its respective disk for moving the disk into contact with its string upon the depression of its key, a rotatable shaft parallel with the axes of the disks, a plurality of wings rotatable therewith, a plurality of vibratory tremolo hammers, one to each string, and means connected to each key and each hammer for causing the wings and hammers to coöperate to vibrate the hammers.

13. A violin piano, having a plurality of strings, a key-board, a damper mechanism for each string, a plurality of rotary bowing disks one to each string and normally out of contact with the string, means for operably connecting a key of the key-board to its respective disk for moving the disk into and out of engagement with its respective string, a rotary shaft disposed transversely of the instrument, a plurality of wings carried thereby and disposed to operate in front of all of said strings, a plurality of tremolo hammers one to each string, and means operably connected with each tremolo hammer and a key of the key-board for moving said hammer into engagement with the wings.

14. A violin piano, having a plurality of strings, a key-board, a rotary shaft, a plurality of bowing disks one to each string mounted upon and rotatable with said shaft, said disk normally being out of contact with the string, a vertically movable rod, one to each key of the key-board, means connecting each rod to its respective bowing disk to cause the disk to engage its respective string, a damper for each string, another rotary shaft, a plurality of wings carried thereby, a plurality of tremolo hammers, one to each string, and means for connecting a tremolo hammer to each rod, whereby when the key is depressed, its respective tremolo hammer is thrown into engagement with the wings.

15. A violin piano, having a plurality of strings, a key-board, a plurality of rotary bowing disks, one to each string and normally out of contact therewith, means operably connecting each disk with a key of the key-board for moving the disk into contact with the string when the key is depressed, a rotary shaft, a plurality of wings carried thereby, a plurality of vibratory hammers, one to each string and key, means to lift the outer end of each hammer operably connecting the hammer to its respective key, and a spring arm carried by each hammer and disposed to be thrown into the path of the rotating wings when the outer end of the hammer is lifted, whereby the rotation of the wings in engagement with said spring arm will impart a vibrating movement to the hammer.

In testimony that I claim the foregoing as my own, I have hereto affixed my signature in the presence of two witnesses.

ERICK SILEN.

Witnesses:
WALDEMAR SETON,
M. M. BLOCH.

---

Copies of this patent may be obtained for five cents each, by addressing the "Commissioner of Patents, Washington, D. C."